US007036601B2

(12) United States Patent
Berg et al.

(10) Patent No.: US 7,036,601 B2
(45) Date of Patent: May 2, 2006

(54) APPARATUS AND METHOD FOR TRANSPORTING, DEPLOYING, AND RETRIEVING ARRAYS HAVING NODES INTERCONNECTED BY SECTIONS OF CABLE

(75) Inventors: Arne Berg, Kattem (NO); Lars Inge Hofstad, Stjørdal (NO); Paul Travis, Aberdeen (GB)

(73) Assignee: Weatherford/Lamb, Inc., Houston, TX (US)

( * ) Notice: Subject to any disclaimer, the term of this patent is extended or adjusted under 35 U.S.C. 154(b) by 171 days.

(21) Appl. No.: 10/266,715

(22) Filed: Oct. 6, 2002

(65) Prior Publication Data

US 2004/0065443 A1  Apr. 8, 2004

(51) Int. Cl.
*E21B 19/00* (2006.01)

(52) U.S. Cl. .................. 166/385; 166/77.1; 242/388.6; 242/402

(58) Field of Classification Search ............... 166/380, 166/385, 77.2; 242/388.6, 402, 407, 118.41, 242/118.4

See application file for complete search history.

(56) References Cited

U.S. PATENT DOCUMENTS

| 1,621,714 | A |   | 3/1927  | Dyer et al.       |          |
|-----------|---|---|---------|-------------------|----------|
| 3,321,185 | A | * | 5/1967  | Zenke             | 242/388  |
| 3,605,055 | A | * | 9/1971  | Grady             | 336/185  |
| 3,661,342 | A | * | 5/1972  | Sears             | 242/118.41 |
| 3,853,285 | A | * | 12/1974 | Woodring          | 242/378.1 |
| 4,177,961 | A | * | 12/1979 | Gruenewald        | 242/405.2 |
| 4,195,794 | A | * | 4/1980  | Ricci et al.      | 242/396.9 |
| 4,387,863 | A | * | 6/1983  | Edmonston et al.  | 242/118.4 |
| 4,451,013 | A |   | 5/1984  | Bedrosian         |          |
| 4,657,140 | A |   | 4/1987  | Zagar et al.      |          |
| 4,696,438 | A | * | 9/1987  | Myers             | 242/118.41 |
| 4,775,009 | A |   | 10/1988 | Wittrisch et al.  |          |
| 4,796,830 | A |   | 1/1989  | Gelfman           |          |
| 4,880,182 | A | * | 11/1989 | Gelfman           | 242/613  |
| 4,904,975 | A | * | 2/1990  | Medenbach         | 336/192  |
| 4,986,350 | A |   | 1/1991  | Czernichow        |          |

(Continued)

FOREIGN PATENT DOCUMENTS

DE       4024619       12/1991

(Continued)

OTHER PUBLICATIONS

Search Report, Application No. GB 0323332.7, dated Jan. 16, 2004.

*Primary Examiner*—David Bagnell
*Assistant Examiner*—G M Collins
(74) *Attorney, Agent, or Firm*—Patterson & Sheridan, L.L.P.

(57) ABSTRACT

An apparatus and method for transporting, deploring, and retrieving an array is disclosed. The array has a plurality of nodes interconnected by sections of cable and can be transported, deployed, and retrieved with the apparatus and method of the present invention. The apparatus includes a plurality of first divisions and a plurality of second divisions. The first divisions have first portions or holders capable of individually accommodating the nodes. The second divisions are alternatingly positioned adjacent the first divisions. The second divisions have second portions or surfaces capable of individually accommodating the sections of cable. The first and second divisions can be integral portions of the apparatus, can be separate members positioned on the apparatus, or can be used with a standard cable drum. Preferably, the second divisions can be rotated relative to the first divisions to tightly wind and easily unwind the sections of cable.

67 Claims, 11 Drawing Sheets

U.S. PATENT DOCUMENTS

| | | |
|---|---|---|
| 5,181,565 A | 1/1993 | Czernichow |
| 5,243,562 A | 9/1993 | Laurent et al. |
| 5,303,773 A | 4/1994 | Czernichow et al. |
| 5,335,874 A * | 8/1994 | Shrum et al. ............ 242/118.4 |
| 5,355,952 A | 10/1994 | Meynier |
| 5,361,130 A | 11/1994 | Kersey et al. |
| 5,401,956 A | 3/1995 | Dunphy et al. |
| 5,493,390 A | 2/1996 | Varasi et al. |
| 5,503,225 A | 4/1996 | Withers |
| 5,524,709 A | 6/1996 | Withers |
| 5,767,411 A | 6/1998 | Maron |
| 5,779,226 A | 7/1998 | Wudtke |
| 5,860,483 A | 1/1999 | Havig |
| 5,892,733 A | 4/1999 | Havig |
| 5,925,879 A | 7/1999 | Hay |
| 5,926,437 A | 7/1999 | Ortiz |
| 5,957,401 A * | 9/1999 | O'Donnell ............... 242/404.3 |
| 6,016,702 A | 1/2000 | Maron |
| 6,039,280 A * | 3/2000 | Stephens et al. ......... 242/388.6 |
| 6,049,508 A | 4/2000 | Deflandre |
| 6,055,720 A * | 5/2000 | Finn et al. .................... 29/605 |
| 6,072,567 A | 6/2000 | Sapack |
| 6,086,008 A * | 7/2000 | Gray et al. .............. 242/388.6 |
| 6,269,198 B1 | 7/2001 | Hodgson et al. |
| 6,385,132 B1 | 5/2002 | Sackett |
| 6,404,961 B1 | 6/2002 | Bonja et al. |

FOREIGN PATENT DOCUMENTS

| | | |
|---|---|---|
| EP | 0 612 655 A3 | 8/1991 |
| EP | 0582745 | 2/1994 |
| WO | WO 0204984 | 1/2002 |

* cited by examiner

APPARATUS AND METHOD FOR TRANSPORTING, DEPLOYING, AND RETRIEVING ARRAYS HAVING NODES INTERCONNECTED BY SECTIONS OF CABLE

CROSS-REFERENCE TO RELATED APPLICATIONS

This application is filed concurrently with U.S. patent application Ser. No. 10/266,903, entitled "Multiple Component Sensor Mechanism;" U.S. Provisional Patent Application Ser. No. 60/416,932, entitled "Clamp Mechanism for In-Well Seismic Sensor;" and U.S. patent application Ser. No. 10/266,716, entitled "In-Well Seismic Sensor Casing Coupling Using Natural Forces in Wells," which contain related subject matter and are incorporated herein by reference in their entirety.

FIELD OF THE INVENTION

The present invention relates generally to an apparatus and method for transporting, deploying, and retrieving an array having a plurality of nodes interconnected by sections of cable and, more particularly to an apparatus and method for transporting, deploying, and retrieving a pre-assembled fiber optic in-well seismic array having a plurality of fiber optic sensors, clamp mechanisms, and sections of cables between sensors.

BACKGROUND OF THE INVENTION

Arrays having a plurality of nodes interconnected by sections of cable exist in the art. Ocean bottom cables, umbilical cables, telecommunication cables, towed hydrophone arrays, and in-well seismic arrays are just some examples of arrays having a plurality of nodes interconnected by sections of cable. In general, the nodes can be fiber optic sensors, electrical sensors, hydrophones, geophones, or cable connectors, among numerous other devices. Difficulties are encountered when the sections of cable and the nodes are wound onto and unwound from a cable drum or other carrying device. Because the nodes may be larger and may be less flexible than the sections of cable, the nodes may form numerous bulges when winding the array on the drum or other carrying device. Consequently, the array cannot be uniformly wound or organized on the drum or carrying device, which leads to inefficient use of space and potential entanglement of the cable sections and nodes, among other problems. Furthermore, the nodes may be delicate or may require special protection. Therefore, pre-assembling the array and winding the array on the drum or other carrying device may not be possible, because the nodes must be transported under separate protection and assembled to the sections of cable on site.

It is therefore desirable to provide an apparatus and method for the transportation, deployment, and retrieval of a pre-assembled array having a plurality of nodes interconnected by sections of cable. The present invention is directed to overcoming, or at least reducing the effects of, one or more of the problems set forth above.

SUMMARY OF THE INVENTION

An apparatus and method for transporting, deploying, and retrieving an array is disclosed. The array has a plurality of nodes interconnected by sections of cable. For example, the array can be an in-well seismic array having a plurality of seismic stations interconnected by sections of inter-nodal cable. The array can be pre-assembled and transported, deployed, and retrieved with the disclosed apparatus and method of the present invention. The apparatus includes a plurality of first divisions and a plurality of second divisions. The first divisions have first portions or holders capable of individually accommodating the nodes. The second divisions are alternatingly positioned between the first divisions. The second divisions have second portions or surfaces capable of individually accommodating the sections of cable. The first and second divisions can be integral portions of the apparatus, can be separate members positioned on the apparatus, or can be used with a standard cable drum. Preferably, the second divisions can be rotated relative to the first divisions to tightly wind and easily unwind the sections of cable.

BRIEF DESCRIPTION OF THE DRAWINGS

The foregoing summary, a preferred embodiment, and other aspects of the present invention will be best understood with reference to a detailed description of specific embodiments of the invention, which follows, when read in conjunction with the accompanying drawings, in which.

DETAILED DESCRIPTION OF THE INVENTION

In the disclosure that follows, in the interest of clarity, not all features of actual implementations of an apparatus and method for transporting and installing an array are described in this disclosure. It will of course be appreciated that in the development of any such actual implementation, as in any such project, numerous engineering and design decisions must be made to achieve the developers' specific goals, e.g., compliance with mechanical and business related constraints, which will vary from one implementation to another. While attention must necessarily be paid to proper engineering and design practices for the environment in question, it should be appreciated that the development of an apparatus according to the present invention would nevertheless be a routine undertaking for those of skill in the art given the details provided by this disclosure.

Figure 1:
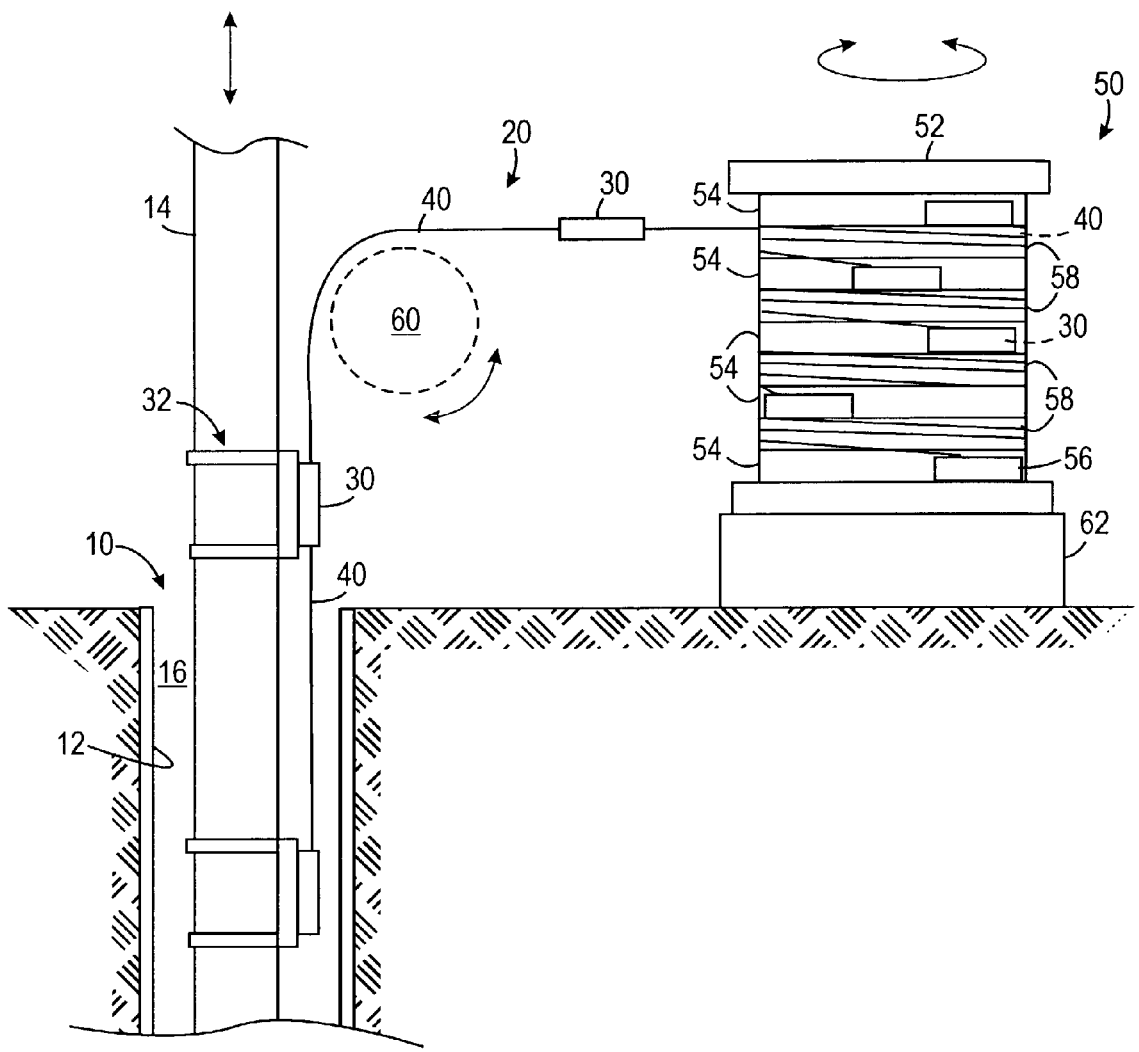
FIG. 1 schematically illustrates an apparatus according to the present invention for transporting, deploying, and retrieving a seismic array at a well.

Referring to the schematic illustration in FIG. 1, an array 20 is shown being deployed with an apparatus 50 according to the present invention. In the present example, the array 20 is a fiber optic in-well seismic array used in the exploration of a hydrocarbon reservoir. The array 20 has a plurality of nodes or sensors 30 interconnected by sections of cable 40. The sensors 30 can include individual sensors or can include sensor assemblies having numerous sensors and other components. The array 20 is shown deployed in a well 10, which has been drilled down to a subsurface production zone and is equipped for the production of petroleum effluents. Typically, the well 10 includes a casing 12 coupled with the surrounding formations by injected cement. The well 10 may be fifteen to twenty thousand feet or more in depth. Production tubing 14 can be lowered into the cased well 10. The annulus 16 may be filled with a drilling fluid (not shown) having a high temperature and pressure, which can present an extremely corrosive and hostile environment.

During deployment, the array 20 is coupled to the production tubing 14 and is lowered to a desired depth in the well 10, which may be thousands of feet. Once deployed in the well 10, the sensors 30 are preferably coupled to the casing 12 for seismic sensing. Various techniques exist in the art to couple the sensors 30 to the casing 12 for seismic sensing. In the present example, the sensors 30 are initially coupled to the tubing 14 and are eventually coupled to the casing 12 using clamp mechanisms 32. A preferred clamp mechanism for use with a multiple component sensor of the present invention is disclosed in U.S. Provisional Patent Application Ser. No. 60/416,932, which is filed concurrently herewith, is entitled "Clamp Mechanism for In-Well Seismic Station," and is incorporated herein by reference in its entirety.

As is known in the art, seismology involves the detection of acoustic waves to determine the strata of geologic features, and hence the probable location of petroleum effluents. The sensors 30 are interconnected by the inter-nodal cables 40 to a source/sensing/data collection apparatus (not shown), which typically includes a demodulator and optical signal processing equipment (not shown). The inter-nodal cables 40 are typically ¼-inch diameter capillary tubes housing optical fibers between the sensors 30 and the source/sensing/data collection apparatus. The sensors 30 can include any of the various types of acoustic and/or pressure sensors known in the art.

A seismic generator (not shown) arranged at the surface or in another well is used to generate acoustic waves. Acoustic waves radiate from the source along direct paths and reflected paths through the various layers of earth. The seismic waves cause the surrounding earth layers to react, and the motion is detected by the sensors in the sensors 30 through the casing 10 coupled to the earth. Resulting signals are transmitted through the inter-nodal cable 40 to the source/sensing/data collection apparatus, which interrogates the sensors 30. As is known in the art of fiber optic based seismic sensing, each sensor 30 can includes one or more fiber optic based sensors, such as fiber Bragg gratings (FBG's), that reflect a narrow wavelength band of light having a central wavelength. If each sensor 30 has a different reflection wavelength, the reflected signals may be easily detected using Wavelength Division Multiplexing (WDM) techniques. If the sensors have the same wavelength, reflected signals can be resolved in time using Time Division Multiplexing (TDM) techniques. Such multiplexing technologies and mixtures thereof are well known in the art.

When performing vertical seismic profiling, the sensors 30 of the array 20 are distributed over a known length, which can be as great as 5000 feet. Over the known length, the sensors 30 can be evenly spaced at desired intervals, such as every 10 to 20 feet, for providing a desired resolution. Accordingly, the fiber optic in-well seismic arrays 20 can include hundreds of sensors 30 and associated clamp mechanisms 32. Because fiber optic connectors (not shown) on the inter-nodal cables 40 between the sensors 30 can generate signal loss and back reflection of the signal, the use of such connectors is preferably minimized or eliminated in the array 20. The practical consequence of limiting the use of fiber optic connectors is that all or most of the sensors 30 must be spliced with the inter-nodal cables 40 before being transported to the well 10.

Accordingly, the present invention is directed to an apparatus and method for efficiently and reliably transporting, deploying, and retrieving a pre-assembled array, such as the fiber optic in-well seismic array 20 depicted in FIG. 1. An embodiment of the apparatus 50 according to the present invention is illustrated in FIG. 1. The apparatus 50 includes a carrying device or body 52 having a plurality of first divisions 54 and a plurality of second divisions 58. In one embodiment, the first and second divisions 54 and 58 can be integral portions of the body 52. In a preferred embodiment, the first and second divisions 54 and 58 can be individual members alternatingly positioned on the body 52.

As discussed above, one problem associated with arrays having a plurality of nodes interconnected by sections cable is the inability to neatly organize, wind, and unwind the array during deployment and retrieval. The first and second divisions 54 and 58 according to the present invention enable the array 20 to be neatly organized, wound, and unwound during deployment and retrieval. Consequently, the array 20 or major portions thereof can be pre-assembled and transported to the well, which can reduce deployment and retrieval time.

In particular, each of the first divisions 54 includes a portion or holder 56 for individually accommodating or holding a sensor 30 of the array 20. Thus, the first divisions 54 can make room for the nodes 30 of the array 20, can support the nodes 30 in a particular position, and/or can keep the nodes 30 from moving. The holders 56 can protect the sensors 30 during transport and can individually release and receive the sensors 30 during deployment and retrieval of the array 20. As best described below, each holder 56 can also accommodate or hold a clamp mechanism 32 having the sensor 30 installed therein, which can greatly facilitate deployment at the well 10.

In one embodiment, the holder 56 can merely be an outer surface of the first division 54 or can be a cavity defined in the first division 54. Depending on the shapes and dimensions of nodes on an array, the holder 56 can be configured to accommodate or hold a particular node, sensor, clamp mechanism, or other device. In another embodiment, the holder 56 can be an extension, drawer, panel, clamp, or like structure for holding and releasing the node (i.e., sensor 30 and/or clamp mechanism 32) or other device.

Each of the second divisions 58 individually accommodates or holds the internodal cable 40 between sensors 30. The second divisions 58 keep the sections of cable 40 separate from the sensors 30 and can individually release and receive the sections of cable 40 during deployment and retrieval of the array 20. Because the length of cable 40 between sensors 30 can vary on the array 20 or can vary from one array to another, the second divisions 58 can neatly accommodate or hold the different lengths of cable 40. Thus, the second divisions 54 can make room for the sections of cable 40 of the array 20, can support the sections of cable 40 in a particular position, or can keep the sections 40 from moving.

In one embodiment, the first and second divisions 54 and 58 can be fixedly connected to the body 52. Rotation of the body 52, therefore, can cause rotation of the first and second divisions 54 and 58. Preferably, at least one of the divisions 54 or 58 is independently rotatable with respect to the other divisions. For example, the second divisions 58 for accommodating or holding the section of cable 40 are preferably individually rotatable relative to the first divisions 54 adjacent thereto. Having the second divisions 58 rotatable relative to the adjacent first divisions 54 can allow the sections of cable 40 to be tightly wound on the second divisions 58 when installing the array 20 on the apparatus 50, as described in more detail below.

During deployment of the array 20, equipment and methods known in the art can be used with the apparatus 50 to install the array 20 in the well 10. For example, a sheave wheel 60, a rotation mechanism 62, and other equipment known in the art or installation personnel can be used. The body 52 can be positioned on the rotation mechanism 62. Although shown vertically in FIG. 1, the body is preferably oriented horizontally on the rotation mechanism 62 so that any slack that may develop in the cable 40 will not interfere with operation of the apparatus 50. When the body 52 is rotated by the mechanism 62, the sensors 30 and inter-nodal cables 40 can be individually and sequentially fed from the divisions 54 and 58 and coupled to the tubing 14 using the clamp mechanisms 32.

In one embodiment, the apparatus 50 can be an independent apparatus capable of being used with existing equipment for ocean bottom cables, telecommunication cables, umbilical cables, in-well sensors, such as pressure and temperature gauges, or towed hydrophone streamers, among other arrays. In another embodiment, the apparatus 50 can incorporate or be used in conjunction with a standard cable drum, which is a standard piece of equipment used with arrays.

Figure 2:
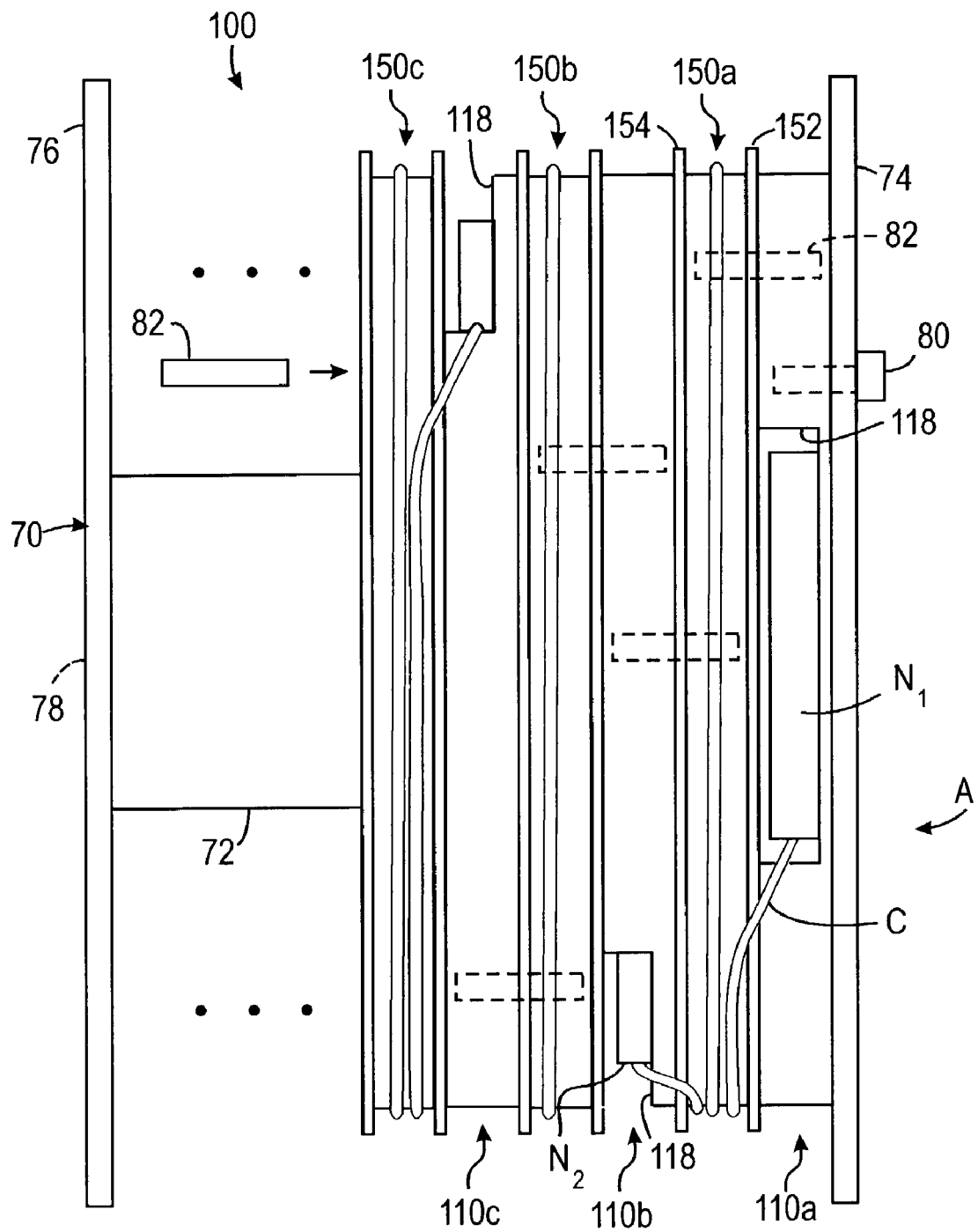
FIG. 2 illustrates an embodiment of a transportation, deployment, and retrieval apparatus according to the present invention for use with a standard cable drum.

Referring to FIG. 2, an embodiment of an apparatus 100 for transporting, deploying, and retrieving an array A is illustrated for use with a standard cable drum 70. Being compatible with the cable drum 70, the apparatus 100 can make use of existing spooling units, rotation tables, and other equipment associated with arrays. In FIG. 2, the apparatus 100 is depicted in a basic form to show the gross anatomy of the disclosed apparatus 100. One of ordinary skill in the art will appreciate that the basic form can be altered without departing from the present invention.

The standard cable drum 70 typically includes a central portion or cross member 72 with first and second sidewalls 74 and 76 connected on the ends. The central portion 72 defines an internal bore 78 therethrough for mounting the drum 70. For illustrative purposes, the apparatus 100 is shown only partially installed on the drum 70, and the array A is only partially shown installed on the apparatus 100.

The apparatus 100 includes first divisions 110 having portions or holders 118 for individually accommodating or holding the nodes 30. The holders 118 can be made to accept various types of nodes N, including sensors, clamp mechanisms, or connectors, among other devices. For example, sensor/clamp assemblies 30/32 where the sensors 30 are installed on clamps 32 for an in-well seismic array, such as described above, can be transported together in the holders 118, which can further reduce the time required to deploy the seismic array. The holders 118 simplify the handling of the nodes N and reduce the risk of damage to the nodes N during transport and installation.

The apparatus 100 also includes second divisions 150 for individually accommodating or holding the sections of cables C. The second divisions 150 assure that the sections of cable C between nodes N can separately fit onto the periphery of the members 150 between nodes N, which minimizes the risk of the cable C and nodes N becoming entangled. The second divisions 150 include first and second sidewalls 152 and 154.

In the present embodiment, the first divisions 110 are individual members capable of being positioned on the central portion 72 of the drum 70. The second divisions 150 are also individual members capable of being positioned on the central portion 72 of the drum 70. For example, the first and second divisions 110 and 150 have holes (not shown) in their centers, allowing the divisions 110 and 150 to be positioned and rotated on the central portion 72 of the drum 70. The first divisions 110 are placed on the drum 70 to store the pre-assembled nodes N. The second divisions 150 are placed adjacent the first divisions 110 on the drum 70 to accommodate the sections of cable C between nodes N.

In one embodiment of the present invention, the drum 70 can be modified to allow one or both of the sidewalls 74 or 76 of the drum 70 to be removable from the central portion 72. In this way, the first and second divisions 110 and 150 can be easily positioned on and removed from the central portion 72. Alternatively, and as disclosed in more detail below, the first and second divisions 110 and 150 can be comprised of two or more connectable sections (not shown) for mounting on the central portion 72 of the cable drum 70 when not modified.

In the present embodiment, both the first and second divisions 110 and 150 are rotatably disposed on the central portion 72 of the drum 70. The apparatus 100 includes a plurality of locking members 80 and 82 to keep the divisions 110 and 150 from rotating on the central portion 72 or to keep them from rotating relative to one another. A first locking member 80 is a bolt or rod capable of being positioned through a hole (not shown) in the sidewall 74 of the drum 70 and in throughholes (not shown) in the first division 110a. A number of second locking members 82 are capable of being positioned through the throughholes (not shown) in the first and second divisions 110 and 150 to prevent rotation of the divisions 110 and 150 relative to one another. An example of the through holes in the divisions can be seen in FIG. 3B, as element 172. Such an arrangement of locking members 80 and 82 allows the divisions to be rotated in unison with the cable drum 70, for example, when deploying the array A. In addition, such an arrangement of locking members 80 and 82 allows the divisions to be rotated relative to one another on the cable drum 70, for example, when winding the array A on the apparatus 100.

The apparatus 100 has the advantage of using an existing cable drum and other equipment associated with arrays and the advantage of allowing for flexibility in adjusting the length of cable C between nodes N. To position the seismic array A onto the apparatus 100 and drum 70, the drum 70 is preferably positioned horizontally on a rotation member (not shown). One first division 110a is then mounted on the central portion 72 immediately adjacent the sidewall 74. An end node $N_1$ of the array A is then mounted in the holder 118a of this first division 110a. A second division 150a is mounted adjacent the first division 110a. Most of the section of cable C connected to the first node $N_1$ is then wound onto the second division 150a. Another first division 110b is then positioned adjacent the second division 150a on the drum 70. The next node $N_2$ of the array A is positioned in the holder 118b of this next division 110b. The section of cable C can be tightened about the intermediate second division 150a by rotating the one or more of the divisions 110a, 110b, and 150a with respect to each other. For example, the first division 110a may be not locked in position, the cable 40 may be wound onto the second division 150a, and the node $N_2$ may be positioned in the holder 118 of the next, first division 110b. In this circumstance, the divisions 110a–b can be rotated relative to one another in opposite directions to tighten the cable on the second division 150a therebetween.

When the cable C is sufficiently tight on the second division 118a, the divisions 110a, 110b and 150a can be locked in position. In other words, the locking member 80 can be passed through the sidewall and into a throughhole in the first division 110a, and a locking member 82 can be passed through aligned holes through the divisions 110a, and 150a. The same procedure can then be repeated for the remainder of the array A until all of the nodes N and sections of cable C are mounted onto the apparatus 100 and drum 70. With the locking members 80 and 82 positioned though the divisions 110 and 150 and the sidewalls 74 and 76, the wound array A can be locked into place with the sections of cable C neatly wound on the apparatus 100.

Figure 3A:
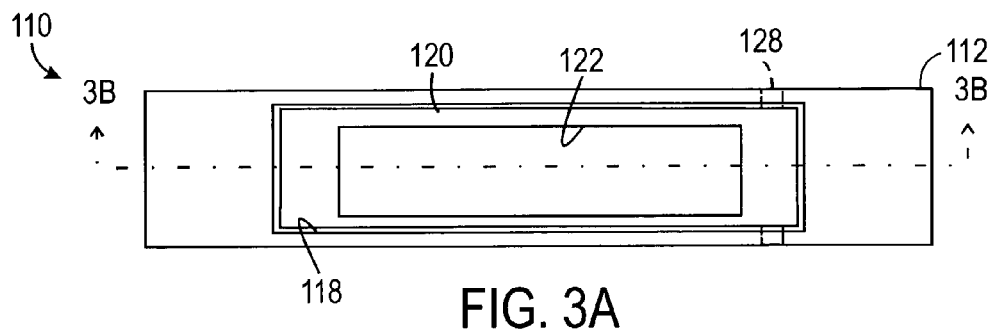
FIGS. 3A–B illustrate various views of an embodiment of a first division or member of an apparatus of the present invention for use with a standard cable drum.
Figure 3B:
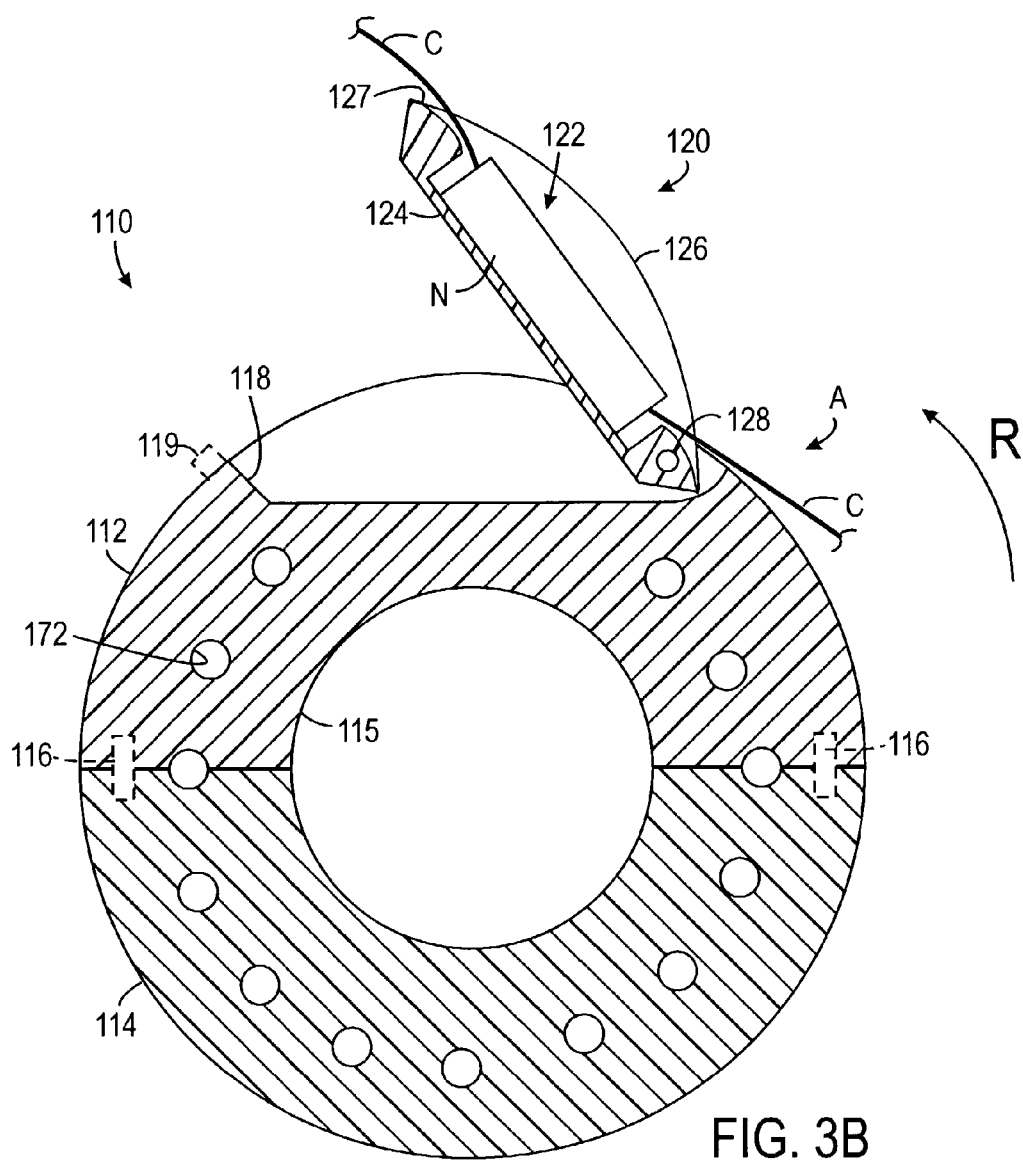

Referring to FIGS. 3A–B, an embodiment of a first division 110 for use with an existing cable drum or other carrying device is illustrated in an end view and a cross-sectional view, respectively. The first division 110 includes a first section 112 and a second section 114. The sections 112 and 114 of the first division 110 are preferably composed of a lightweight, inexpensive, and durable material, such as wood for example. The first and second sections 112 and 114 are connectable. When connected as shown in FIG. 3B, the first and second sections 112 and 114 define an central opening 115 to accommodate a central portion 72 of a cable drum 70 or other carrying device. Having the first and second divisions 112 and 114 connect together makes the first division 110 suitable for attaching to an existing cable drum without the need to modify the drum by removing the sidewalls 74 or 76.

The first and second sections 112 and 114 can connect together with coupling or fastening mechanisms 116 known in the art, such as screws, bolts, brackets or other ordinary techniques. For example, the coupling or fastening mechanisms 116 can include long bolts passing laterally through the sections and having nuts connecting to the ends of the bolts to hold the sections 112 and 114 together. In an alternative example, the coupling or fastening mechanisms 116 can include an interconnecting plate being boltable to the sides of the sections 112 and 114. Such coupling or fastening mechanisms 116 can allow for permanent or non-permanent coupling of the sections 112 and 114. As one skilled in the art will recognize, the coupling or fastening mechanisms 116 for connecting the first and second sections 112 and 114 can constitute a number of mechanism or techniques known in the art. Of course, the first division 110 can also constitute an integrated apparatus without separate sections 112 and 114.

The first division 110 can be used with a locking mechanism, such as a rod 80 described above, to stop rotation of the division 110 relative to adjacent divisions or to the drum. To facilitate this approach, the first division 110 includes a plurality of holes 172 circumscribing the central opening 115.

One of the sections 112 defines a cavity 118. In a preferred embodiment, a drawer 120 is movably positioned in the cavity 118 and is extendable therefrom. The extendable drawer 120 defines a holding area 122 formed by a bottom 124 and one or more sidewalls 126. The holding area 122 can individually hold a node N of an array, such as an in-well sensor. In addition, the holding area 122 can be adapted and shaped to hold a clamp mechanism having the sensor installed therein. Preferably, the extendable drawer 120 has curved or contoured ends or guides 127 adjacent the holding area 122 to prevent entanglement or damage to the sections of cables C positioned adjacent thereto.

In the present embodiment, the extendable drawer 120 is connected to the first section 112 with a hinge 128, enabling the drawer 120 to be pivoted out of the cavity 118, as shown in FIG. 3B. The drawer 120 can be composed of wood, and the pin can be composed of steel, for example. The extendable drawer 120 pivots out of the cavity 118 in an opposite direction to the intended rotation R of the first division 110 when deploying the array A. In this way, as the first division 110 is rotated, the extendable drawer 120 can pivot and extend the node N substantially tangent to the rotation R. Thus, a node N connected to sections of cable C can be readily released from the extendable drawer 120 and first division 110, for example, substantially parallel to the production pipe as it is deployed down the well. In an alternative embodiment to pivoting in the cavity 118, the extendable drawer 120 can be slide in the cavity 118. By sliding, the drawer 120 can extend from the cavity 118 and release the node N during rotation of the member 110. Accordingly, the cavity 118 can include tracks or rails (not shown) on which the drawer 120 slides.

When the first division 110 is installed on a drum or other device and the node N is positioned in the extendable drawer 120, the extendable drawer 120 can be kept in the cavity 118 by the connection of the node N to the cables C. In one embodiment, the first division 110 includes a lock or latch mechanism 119 to keep the extendable drawer 120 in the cavity 118, which may be beneficial when the first division 110 is transported with the drum or other carrying device. For example, the lock or latch 119 can be a bolt lock, a clasp, or other method or techniques known in the art for locking a movable member to another member. Before installation, the lock or latch 119 can be undone, which will allow the extendable drawer 120 to extend during rotation of the member 110.

The node N is preferably held within the drawer 120 by a releasable fastening mechanism or a temporary holding mechanism (not shown). For example, the drawer 120 can have a strap, a cover, a fastener, an adhesive, a clamp, a mounting block, a wedge, an appropriately shaped foam or plastic insert, or other method or technique known in the art for releasably fastening or temporarily holding a device on a surface or in a cavity. The fastener may need to be undone during installation of the array A to allow the node N to be released from the drawer 120. Alternatively, the fastener may release the node N when a predetermined orientation of the drawer 120 is obtained or when the node N is subject to a predetermined force.

If the node N is a delicate sensor to be held in the drawer 120, the drawer 120 preferably holds a transportation receptacle for the delicate sensor. A preferred transportation receptacle for the multiple component sensor mechanism incorporated herein is disclosed in U.S. patent application Ser. No. 10/266,903, which is filed concurrently herewith, is entitled "Multiple Component Sensor Mechanism," and has been incorporated herein by reference in its entirety.

The dimensions of the first division 110 and the extendable drawer 120 can be designed to suit a number of nodes, such as sensors, clamp mechanisms, or other devices on arrays. In the illustrations of FIGS. 3A–B, the first division 110 and extendable drawer 120 are depicted in a basic form to show the gross anatomy of the present invention. One of ordinary skill in the art will appreciate the basic forms can be altered without departing from the present invention. For example, the first division 110 can be configured to hold a number of sensors, which might be beneficial if the cables connecting the sensors at some point in the array are relatively short. In this circumstance, the short cable sections may need to be organized and stored with or in a manner similar to the sensors.

Moreover, although the use of a drawer 120 is preferred for the reasons previously set forth, a drawer 120 may not be necessary in a commercial embodiment. For example, cavity 118 could be configured to directly hold the nodes in the various manners described without the added complication of an extendable drawer 120. Furthermore, a cavity 118 is not strictly required either, as the node could be affixed by many of the known methods and techniques to the outside surface of the first division 110.

Figure 4A:
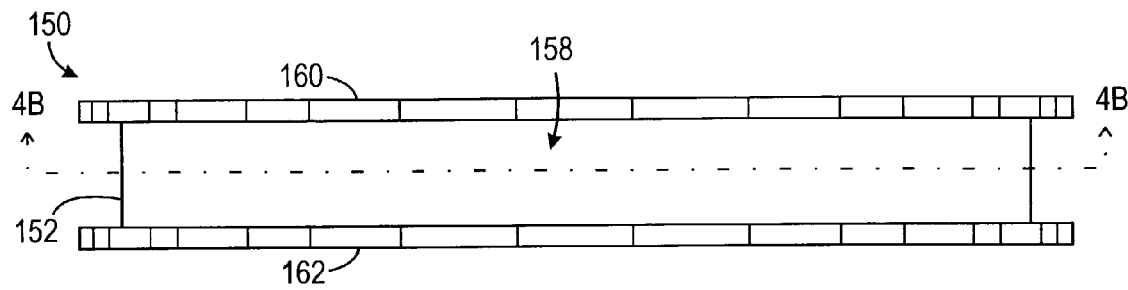
FIGS. 4A–B illustrate various views of an embodiment of a second division or member of an apparatus of the present invention for use with a standard cable drum.
Figure 4B:
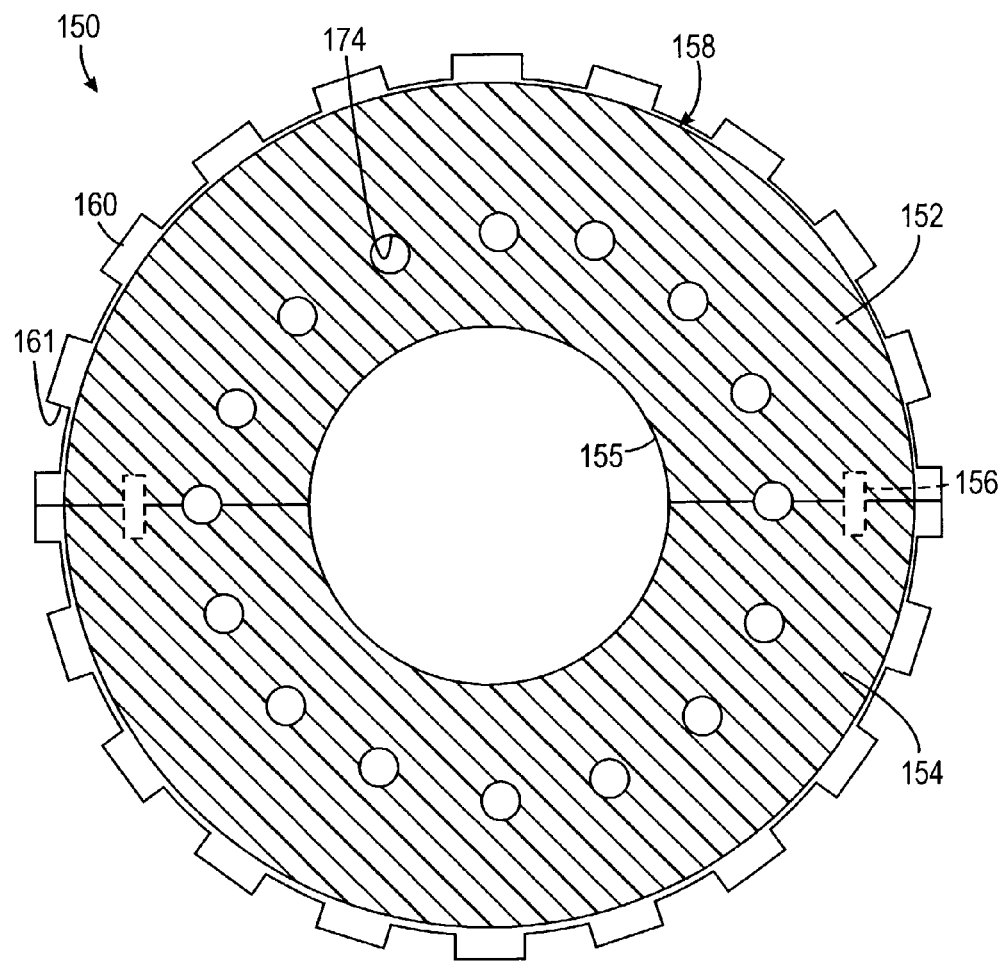

Referring to FIGS. 4A–B, an embodiment of a second division or member 150 for use with an existing cable drum or other carrying device is illustrated in an end view and a cross-sectional view, respectively. The second division 150 is preferably used with the first division 110 of FIGS. 3A–B and is preferably used with an existing, unmodified cable drum.

The second division 150 includes a first section 152 and a second section 154 being connectable together. The sections 152 and 154 can connect together by one or more coupling or fastening mechanisms 156 known in the art. When the first and second section 152 and 154 are connected together, the second division 150 defines a central opening 155 to accommodate a central portion of the drum or other carrying device. As with the first division 110, the second division 150 can also be integrated as a single piece.

The second division 150 is used for coiling the length of cable (not shown) between nodes of the array. The length of cable can typically be between 10 and 20 feet between sensors for in-well seismic sensing, for example. The second division 150 has a surface 158 for accommodating or holding the section of cable and has first and second sidewalls 160 and 162 for keeping the cable on the surface 158. The sidewalls 160 and 162 extend beyond the surface 158 to assure that the cable remains on the surface 158 during winding and unwinding. In the present embodiment, the sidewalls 160 and 162 define a plurality of splines 161 for allowing the sections of cable to easily pass to and from the second division 150. As with the first division 110, the second division 120 contains through holes 174 to permit locking by a bolt 80 or other similar device.

The width and diameter of the second division 150 and the height of the splines 161 can be designed to best suit the length of cable to be stored thereon. As noted above, the length of cable between seismic stations can differ along an array, but can typically be 10 to 20 feet. To accommodate substantially larger length of cable or to better use the available space on the cable drum, second divisions 150 of greater widths or greater depths, for example, can be used or multiple second divisions 150 can be positioned adjacent one another.

Figure 5A:
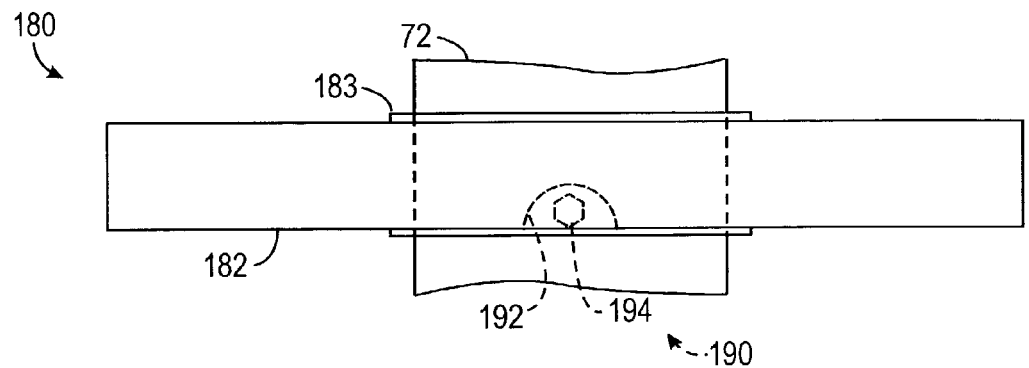
FIGS. 5A–B illustrate a division or member of the apparatus having an alternative embodiment of a locking mechanism.
Figure 5B:
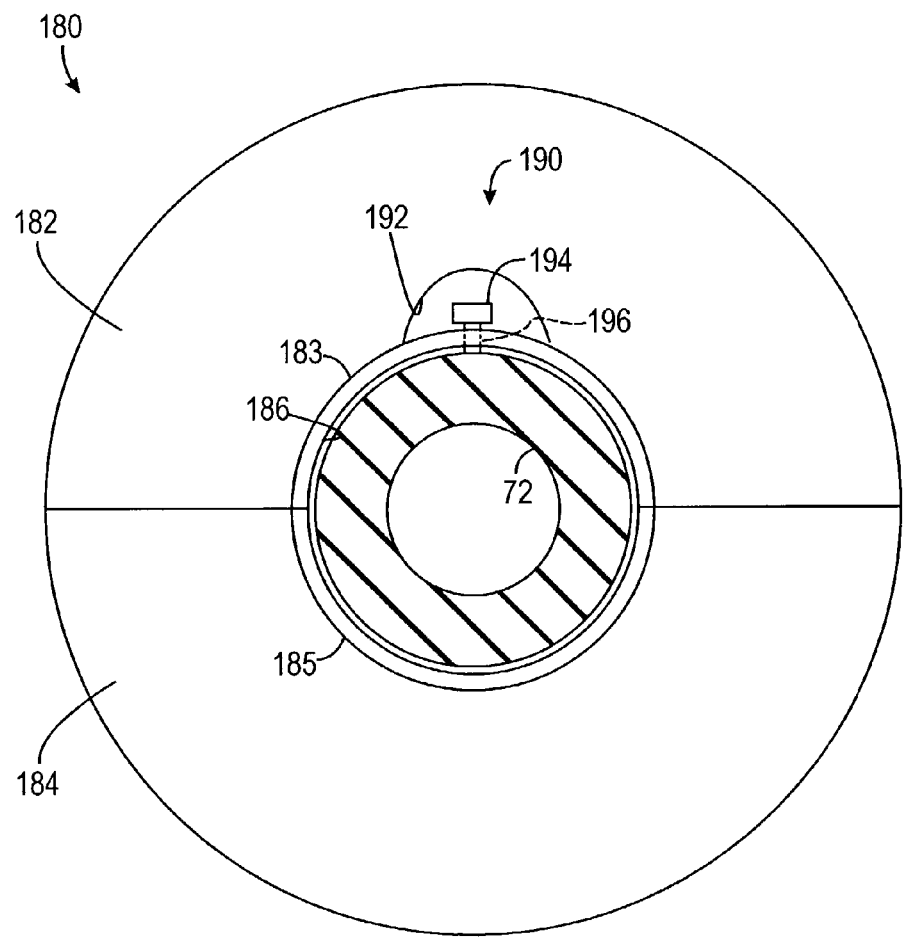

Referring to FIGS. 5A–B, a division or member 180 of the disclosed apparatus is illustrated in an end view and a side view, respectively. The division 180 in FIGS. 5A–B is illustrated generically for clarity, but it is understood that the division 180 can be a first or second division as described above and can include sidewalls (not shown), for example. The division 180 includes first and second sections 182 and 184 connected together about a central or cross member 72 of a cable drum (not shown). The first and second sections 182 and 184 can be made of wood or other material. Each section 182 and 184 includes a semi-cylindrical member 183 and 185, which can be composed of metal, for example. When the sections 182 and 184 are connected together as shown in FIG. 5B, the semi-cylindrical members define a cylindrical opening 186 disposed about the central portion 72.

The division 180 includes an alternative embodiment of a locking mechanism 190. The locking mechanism 190 uses the principle of a set screw known in the art to lock the division 180 on the central portion 72. A pocket or access 192 can be defined in the side of the division. A bolt 192 is threaded into a threaded aperture 196 defined in the semi-cylindrical member 183. When tightened, the bolt 192 engages the central portion 72 and to keep the division 180 from rotating about the central portion 72. The recess 192 allows adjacent divisions to be positioned closely adjacent one another; however, it is understood that this is not strictly necessary. In addition, it is understood that more than one locking mechanisms 190 can be used for the division 180.

Figure 6B:
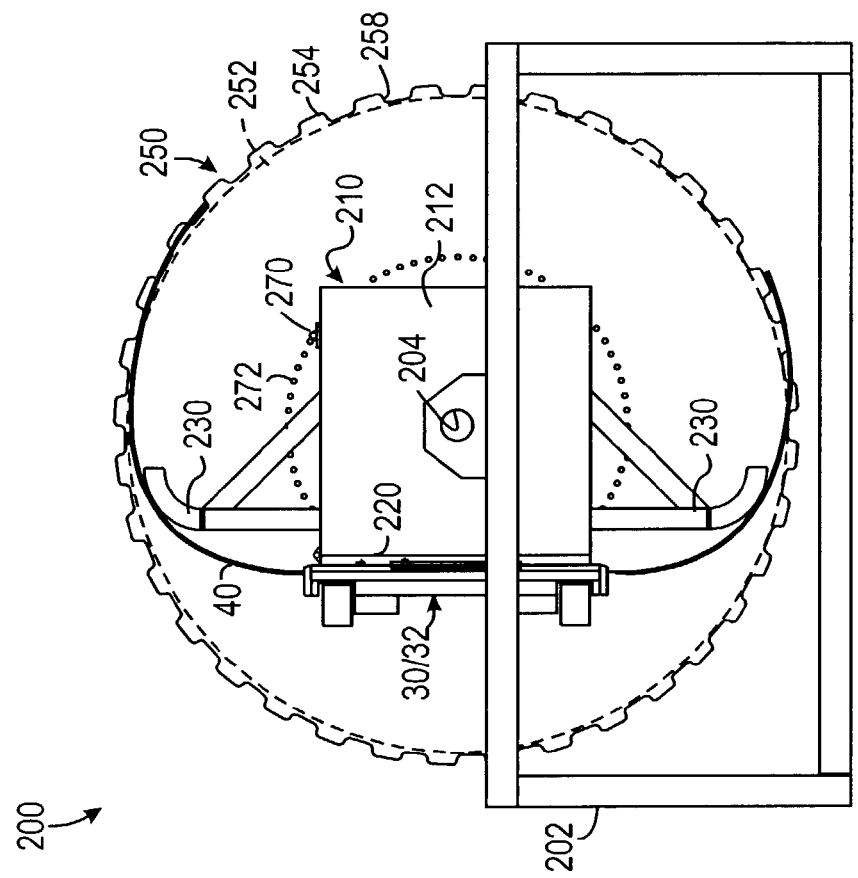
FIGS. 6A–B illustrate various views of another embodiment of a transportation, deployment, and retrieval apparatus according to the present invention.
Figure 6A:
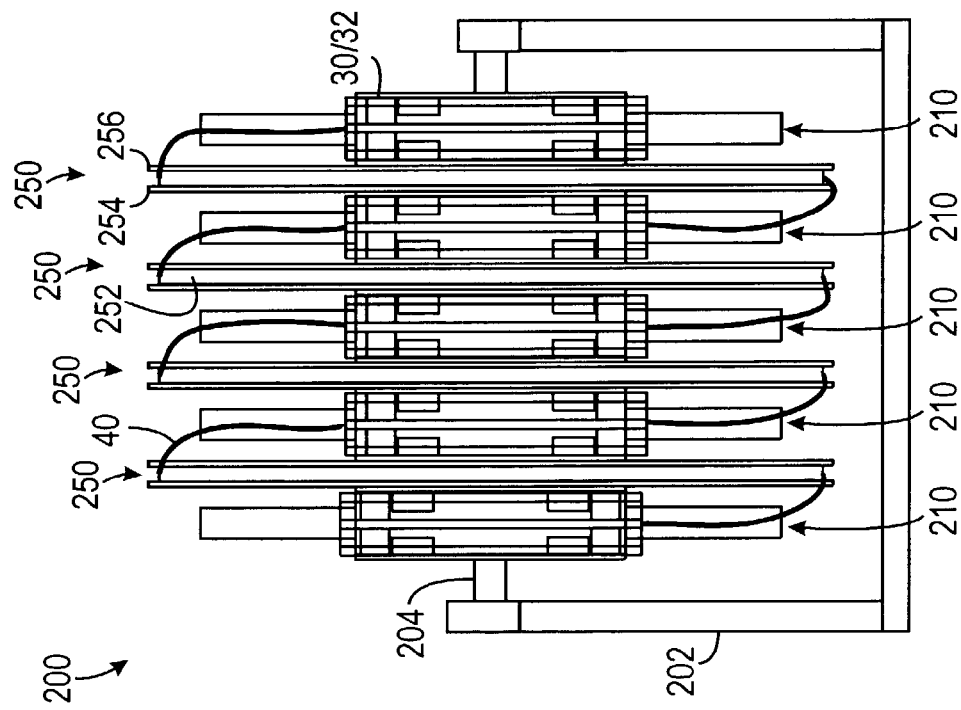

Referring to FIGS. 6A–9D, another embodiment of a transportation, deployment, and retrieval apparatus 200 according to the present invention is illustrated. In FIGS. 6A–B, the apparatus 200 is illustrated in a front view and a side view, respectively. The apparatus 200 in the present embodiment is preferably used with an in-well seismic array having sensors 30 installed in clamp mechanisms 32, as described above.

The apparatus 200 includes a carrying device or body 202 having a central portion or cross member 204. The body 202 can be composed of metal or wood, for example. The cross member 204 can be a steel rod having a length of approximately 53-inches, for example. The body 202 is only schematically shown for the purposes of clarity and can include additional components. For example, the body 202 can include components allowing the body to be lifted by a crane or forklift and can include additional components for protecting the apparatus 200 and array during transport. It is understood that the body 202 and cross member 204 are capable of supporting the weight of the apparatus 200 and array.

The apparatus 200 includes a plurality of first divisions or members 210 for individually accommodating or holding the sensor/clamp assemblies 30/32, having the sensors 30 mounted in the clamp mechanisms 32, such as described herein. The apparatus 200 also includes a plurality of second divisions or members 250 for individually accommodating or holding the inter-nodal cables 40 connected between sensor/clamp assemblies 30/32. In the present embodiment, the apparatus 200 can accommodate five of the first divisions 210 and five of the second divisions 250 having the sensor/clamp assemblies 30/32 and cables 40 pre-assembled thereon. Therefore, for a seismic array requiring 50 to 100 sensors, ten to twenty such apparatus 200 may be required. If necessary or desirable to concatenate several apparatuses containing mounted arrays at the well site, the cables could be coupled at the side by numerous fiber optic connectors or coupling techniques. Alternatively, the apparatus 200 can be designed or lengthened to hold more sensors, clamp mechanisms, and sections of cable so that the use of multiple apparatuses is unnecessary.

Figure 7A:
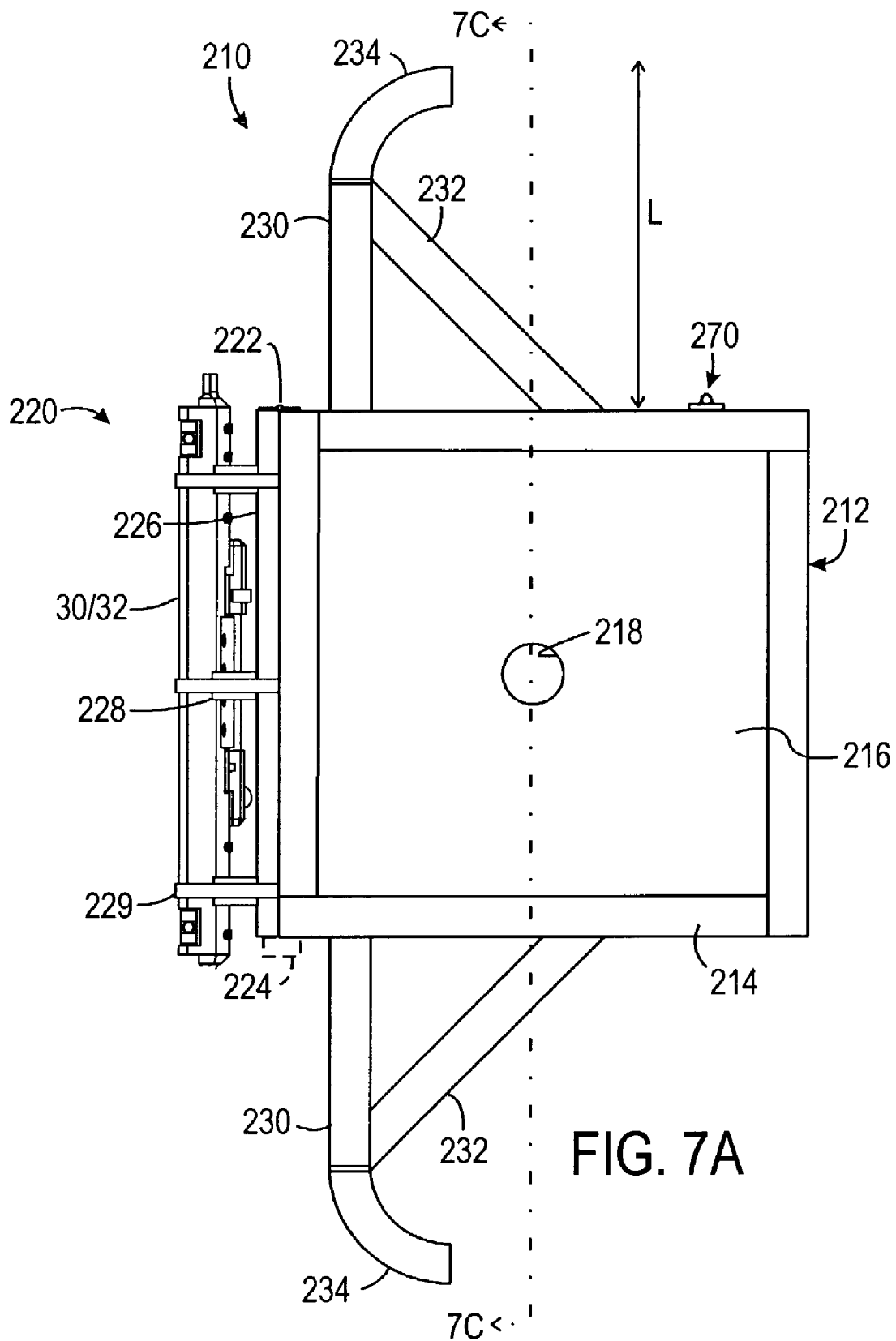
FIGS. 7A–C illustrate various views of a first division or member of the apparatus in FIGS. 6A–B.
Figure 7B:
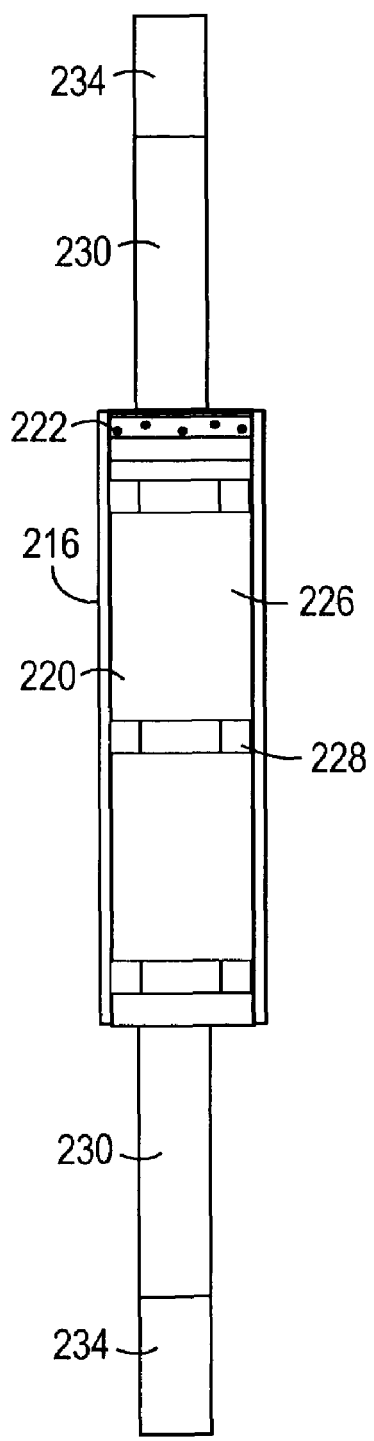
Figure 7C:
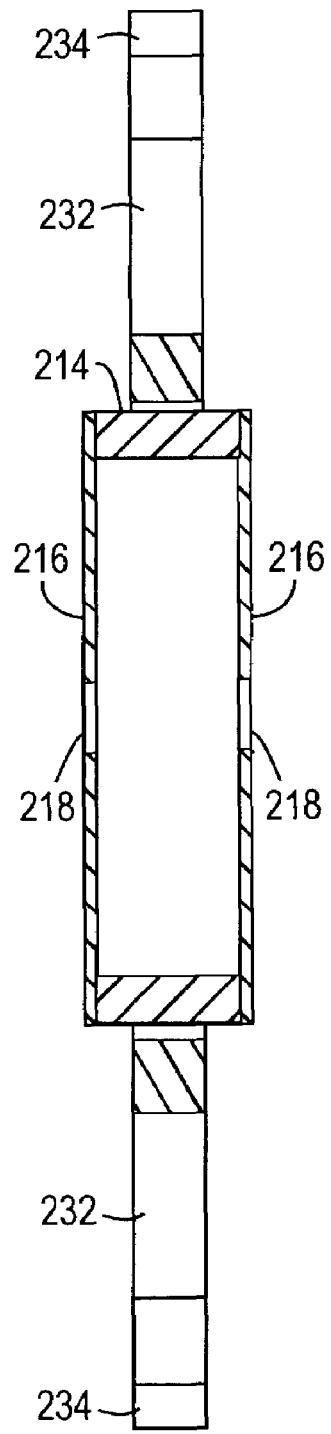

In this embodiment, the first division 210, which is described in more detail in FIGS. 7A–C, includes a frame 212, a holder 220, and arms or guides 230. The holder 220 is connected to the frame 212 and supports the sensor/clamp assembly 30/32. The guides 230 are also connected to the frame 212 adjacent the holder 220. The guides 230 support the sections of cable 40 connected to the sensor/clamp assembly 30/32. The second division 250, which is described in more detail in FIGS. 8A–B, includes a central disk 252 and sidewalls 254 and 256. The central disk 252 has a surface 258 for individually accommodating or holding the sections of cable 40.

As best shown in FIG. 6A, the first and second divisions 210 and 250 are alternatingly positioned on the cross member 204 and are rotatably disposed thereon. As best shown in FIG. 6B, the first divisions 210 each include a locking mechanism 270 capable of engaging holes 272 on the second divisions 250 so that adjacent first and second divisions 210 and 250 can be prevented from rotating relative to one another.

Referring to FIGS. 7A–C, the first division 210 of the apparatus 200 is illustrated in a partially exposed side view, a front view, and a cross-sectional view, respectively. Frame 212 of the first division 210 is preferably square and is composed of four walls 214 and two panels 216. The four walls 214 can be composed of wood members measuring approximately 150-mm by 50-mm. The panels 216 can be composed of 13-mm plywood sheets. The walls 214 and panels 216 of the frame 214 can be attached together using nails, screws, or other methods or techniques known in the art. Each of the panels 216 defines a central opening 218 for passage of the cross member 204 discussed above. The central openings 218 are approximately 77-mm in diameter.

In the present embodiment, the holder 220 is attached to the frame 212 by a hinge 222, which allows the holder 220 to be rotated away from the frame 212, although this is not strictly necessary for use with an in-well seismic array having sensors installed in clamp mechanisms. A lock or latch 224 on the other end can be used to keep the holder 220 adjacent the frame 212.

The holder 220 has a mounting surface 226, which can be configured to hold the sensor/clamp assembly 30/32. For illustrative purposes, the sensor/clamp assembly 30/32 is shown in FIG. 7A and is not shown in FIG. 7B. The mounting surface 226 can include supports 228 and releasable fastening mechanisms or a temporary holding mechanisms 229, such as a belt or strap, to keep the sensor/clamp assembly 30/32 on the mounting surface 226. The in-well sensor/clamp assemblies 30/32 described herein can weigh between 20 and 40-kg. Therefore, the fastener 229 must be capable of adequately holding such a weight to the mounting surface 226. It is understood that the mounting surface 226 of the holder 220 can be configured to hold a number of devices or mechanisms depending on the type of array to be used with the apparatus 200 of the present invention.

The cable guides 230 extend from the frame 212 on both ends of the holder 220. Each cable guide 230 has a supporting arm 232 and a curved end piece 234. The guides 230 project approximately 380-mm from the frame 212 with the curved end pieces 234 making up approximately 90-mm of that length. The curved end pieces 234 also define a radius of approximately 15-mm, which facilitates a 16-inch radial bend for the standard ¼-inch fiber optic inter-nodal cable 40 used for in-well sensing. Smaller radii may damage the cable.

The cable guides 230 can define a channel (not shown) adjacent the curved end pieces 234 to prevent entanglement of the cable. In addition, breakable fasteners, such as bands, can be used on the guides 230 to temporarily hold the cable and prevent inadvertent removal of the cable from the guides 230 during assembly. One of ordinary skill in the art will recognize that the cable guides 230 can be altered to accommodate a particular cable other than that disclosed herein, which might be necessary or beneficial for cables of differing flexibility, for example.

Figure 8B:
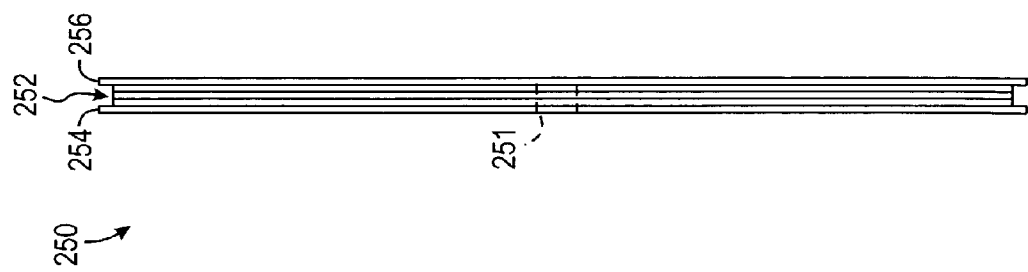
FIGS. 8A–B illustrate various views of a second division or member of the apparatus in FIGS. 6A–B.
Figure 8A:
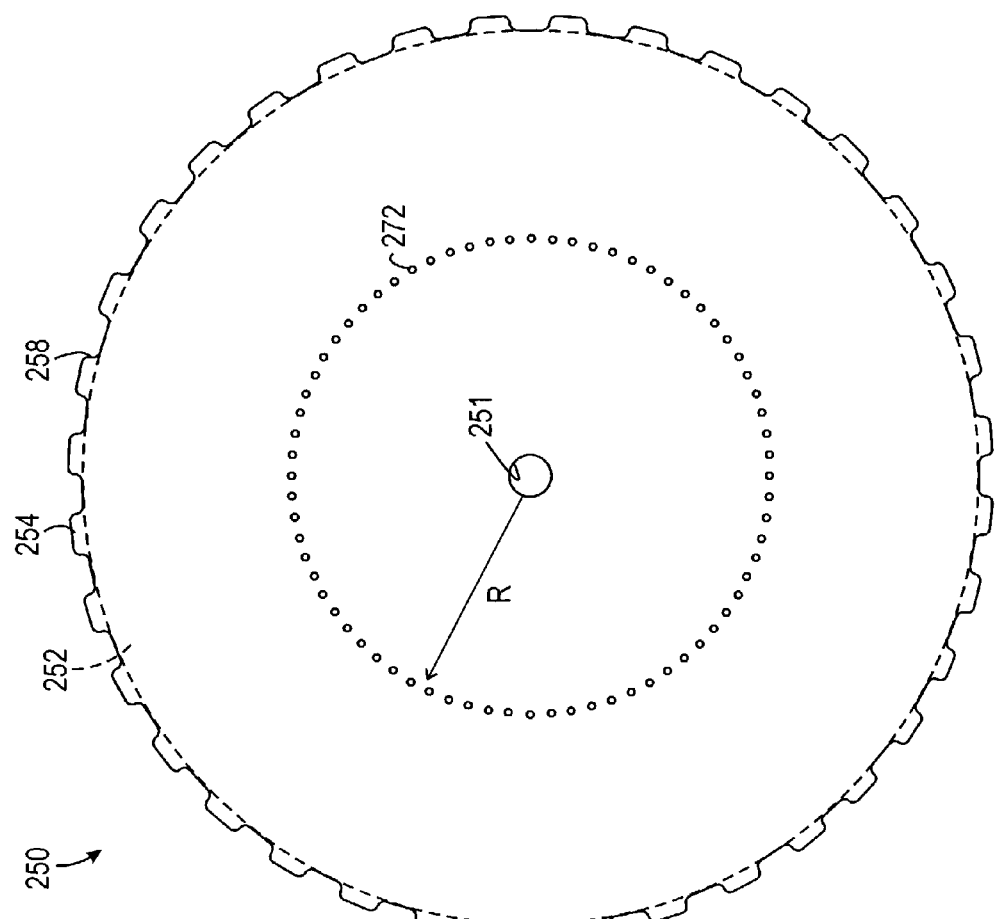

Referring to FIGS. 8A–B, the second division 250 of the apparatus 200 is illustrated in a side view and an end view, respectively. The second division 250 includes a central disk 252 having sidewalls 254 and 256 attached thereto. The sidewalls 254 and 256 define a plurality of splines 258, which are preferably spaced about every 5-degrees around the circumference of the second division 250 for allowing cable to pass between divisions. The splines 258 preferably project approximately 25-mm above the circumference of the central disk 252.

In the present embodiment, the central disk 252 can be composed of several sheets of plywood attached together by methods known in the art. The central disk 252 can be approximately 1625-mm in diameter and approximately 39-mm thick. The sidewalls 254 and 256 can be composed of 13-mm plywood. The second division 250 defines a central opening 251 approximately 76-mm in diameter through the sidewalls 254 and 256 and the central disk 252. One of ordinary skill in the art will appreciate that the dimensions of the second division 250 can be increased or decreased depending on a number of variables, including the amount of cable and thickness of cable to be wound thereon. The second division 250 defines a plurality of holes 272 on one or both sides. The holes 272 are preferably approximately 13-mm in diameter, disposed at a radius R of approximately 435-mm from the center of the second division 250, and positioned approximately every 5-degrees.

Figure 9A:
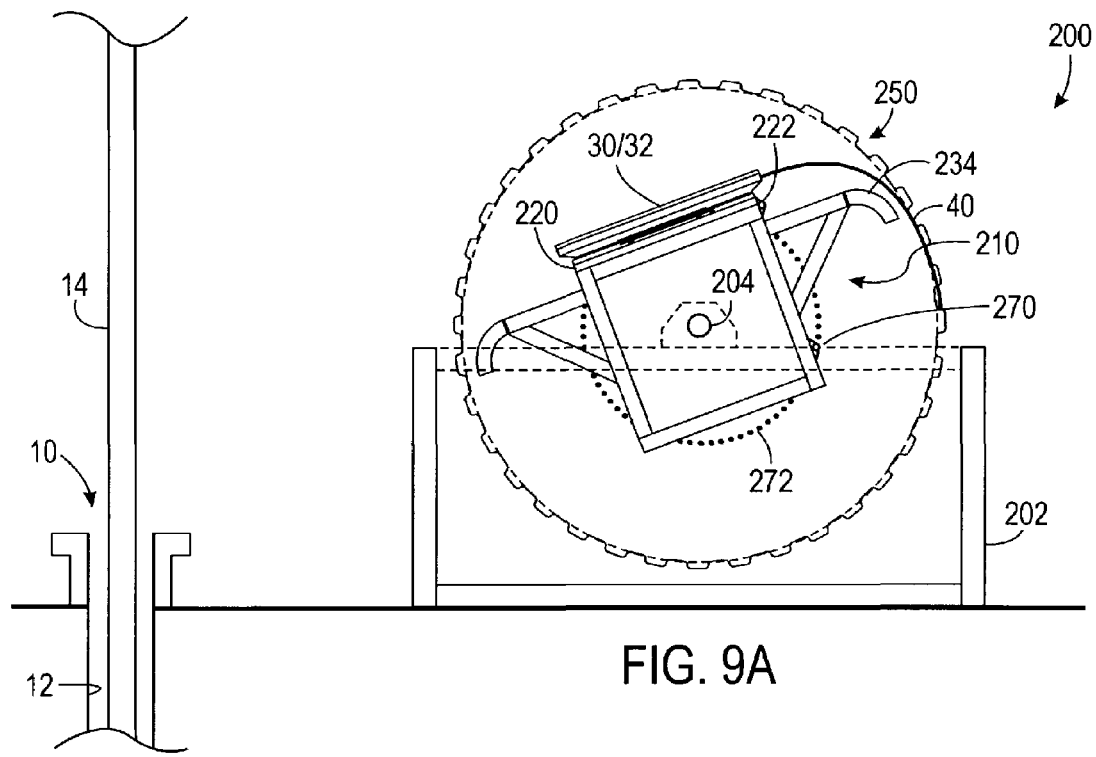
FIGS. 9A–D illustrate use of the apparatus of FIGS. 6A–B in deploying a seismic array at a well.

Referring to FIGS. 9A–D, the apparatus 200 is illustrated in stages of deploying a seismic array in a well 10. In FIG. 9A, the apparatus 200 is shown in a side view positioned adjacent the well 10. A clamp mechanism 32 with an installed sensor 30 is held on the holder 220 of the first division 210 of the apparatus 200. As disclosed above, the sensor/clamp assembly 30/32 can be held, attached, or fastened to the holder 220 by a number of methods and techniques known in the art. This sensor/clamp assembly 30/32 represents the first seismic station for the in-well seismic array. An inter-nodal cable 40 is connected to the sensor/clamp assembly 30/32 and is wound about an adjacent second division 250.

The adjacent divisions 210 and 250 are initially locked together. For example, the locking bolt 270 on the first division 210 engages one of the holes 272 on the second division 250. Numerous other first and second divisions (not shown) are alternatingly arranged on the apparatus 200. In the discussion that follows, only the deployment of this first sensor/clamp assembly 30/32 will be described. It is understood that the steps disclosed below can be substantially the same for other sensor/clamp assemblies on the apparatus 200. Moreover, description of typical equipment and activities otherwise normally present at in-well installation are omitted for clarity.

Figure 9B:
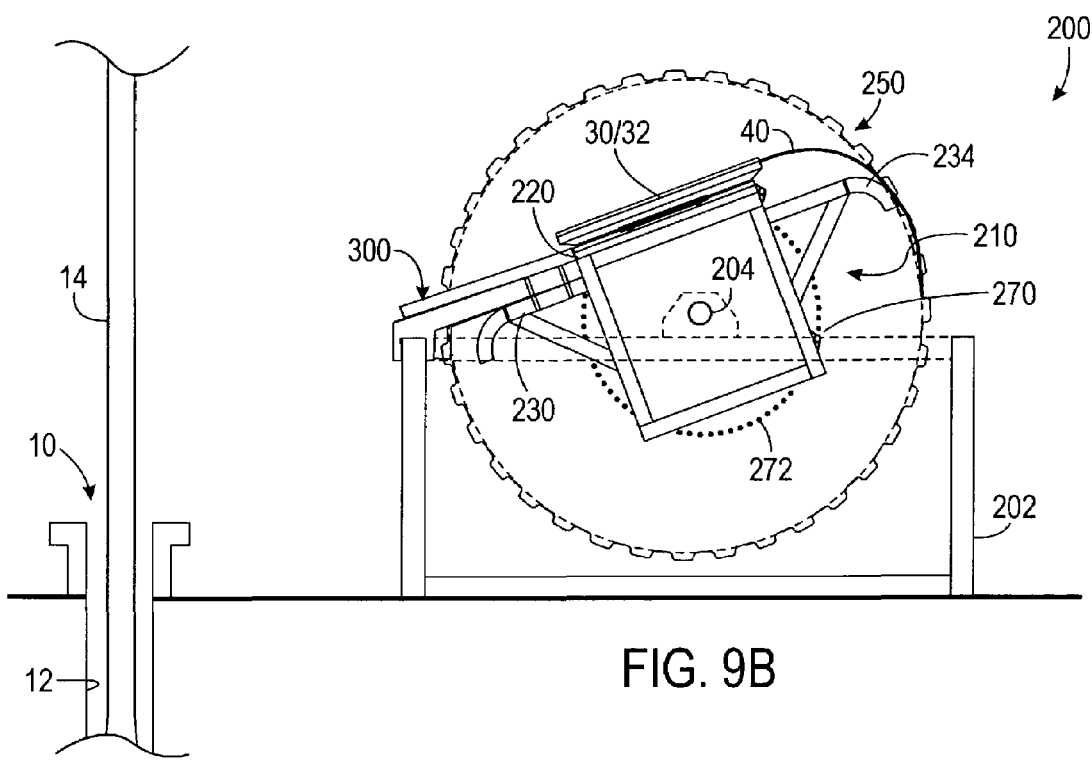

Referring to FIG. 9B, a locking member or bar 300 is attached to the body 202 and cable guide 230 of the first division 210. The locking member 300 can be attached using bolts or other methods known in the art. The locking member 300 prevents the first division 210 from rotating about the cross member 204. The locking mechanism 270 on the first division 210 is then disengaged from the hole 272 defined in the adjacent second division 250. With the adjacent members 210 and 250 unlocked, the second division 250 can be rotated relative to the first division 210 to unwind the cable 40 connected to the sensor/clamp assembly 30/32. To unwind cable from the adjacent second division, the numerous other first and second divisions (not shown) of the apparatus 200 remained locked together and are rotated along with the adjacent second division 250.

In contrast to embodiments disclosed above, it should be noted that the extendable feature of the holder 220 is not used, because the sensor 30 is installed in the clamp mechanism 32. Therefore, it is undesirable to stress the sections of cable 40 by freely releasing the sensor/clamp assembly 30/32 by extending the holder 220 during rotation of the first division 210. Use of the extendable feature of the holder 220 may be used for releasing a sensor, assembly, connector, or other device on the array that is smaller than the sensor/clamp assembly 30/32 described herein. In further contrast to embodiments disclosed above, the first division 210 is locked in place using the locking member 300 to allow the sensor/clamp assembly 30/32 to be dismounted and moved toward the production tubing 14. Locking the first division 210 may not be necessary for releasing a sensor, assembly, connector, or other device on the array that is smaller than the sensor/clamp assembly 30/32 described herein.

Figure 9C:
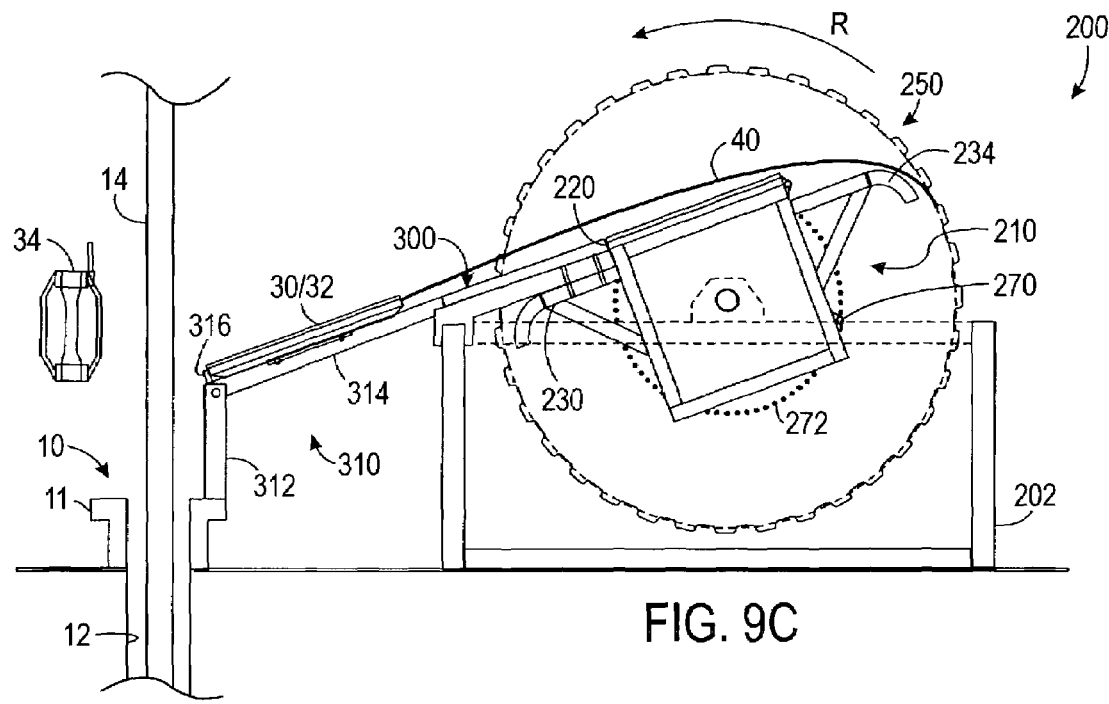

Referring to FIG. 9C, a catching member 310 having a base arm 312 and a pivoting arm or tray 314 is attached to the well head 11. The pivoting arm 314 is pivoted to meet and rest on the locking member 300. The sensor/clamp assembly 30/32 is unattached or unfastened from the holder 220. The second division 250 is rotated in direction R to unwind the cable 40 connected to the sensor/clamp assembly 30/32. The sensor/clamp assembly 30/32 is guided down the locking member 300 to the pivoting arm 312. The pivoting arm 312 includes a stop 316 for holding the sensor/clamp assembly 30/32. A standard 16-inch cannon anchor clamp 34 is made ready for coupling the sensor/clamp assembly 30/32 to the production tubing 14.

Figure 9D:
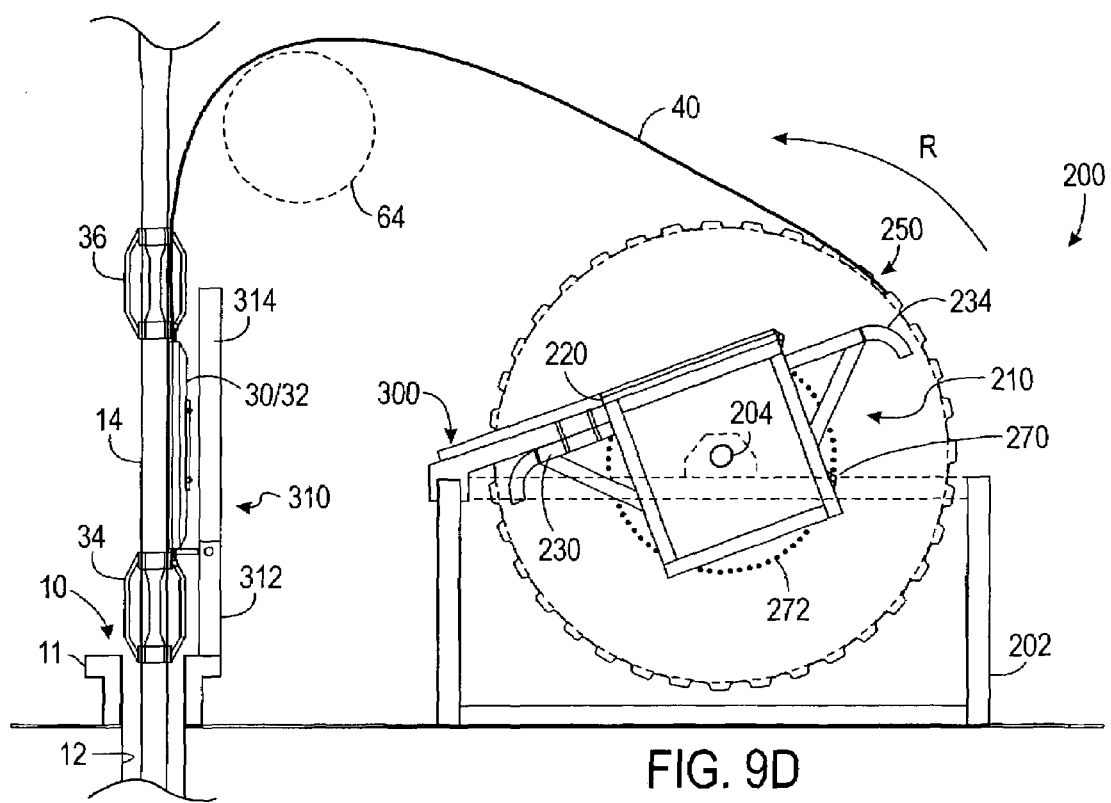

Referring to FIG. 9D, the pivoting arm 314 holding the sensor/clamp assembly 30/32 is rotated adjacent the production tubing 14 so that the sensor/clamp assembly 30/32 is held vertically. A sheave wheel 64 or similar device known in the art is used to unwind the cable 40 from the second division 250 and to position the cable 40 adjacent the production tubing 14. Lower and upper anchor clamps 34 and 36 hold the sensor/clamp assembly 30/32 and cable 40 to the production tubing 14. The base member 312 of the catching mechanism 310 has a sufficient clearance and height to allow the lower clamp 34 to be attached between the well head 11 and the end of the clamp mechanism 50.

Once the sensor/clamp assembly 30/32 is coupled to the production tubing 14, the catching member 310 is moved away from the well head 11. The production tubing 14 is lowered, moving the sensor/clamp assembly 30/32 into the well 10. The sheave wheel 64 is rotated to feed the cable 40 from the second division 250 into the well 10. Additional cable clamps (not shown) can be used to attach the length of cable 40 between the first sensor/clamp assembly 30/32 and the next assembly (not shown) on the apparatus 200. The above steps can then be repeated to deploy an entire array of sensor/clamp assemblies interconnected by sections of cable 40. In addition, the above steps can be reversed to retrieve the sensor/clamp assemblies 30/32 and sections of cable 40 of the array from the well 10 and neatly organize and hold the array on the apparatus 200. As noted above, however, to tightly wind the cable 40 onto the second divisions when retrieving the array requires that the divisions be rotated in relation to one another.

Although the embodiments disclosed herein have been described for use with a fiber optic in-well seismic array, one of ordinary skill in the art will appreciate that the present invention can be used with a number of arrays having a plurality of nodes interconnected by sections of cable and can be used for other applications beyond in-well seismic sensing installations. For example, the disclosed apparatus can be used to transport, deploy, and retrieve geophysical streamer cables, hydrophone and thermister arrays, ocean bottom cables, telecommunication cables, subsea cables, umbilical cables, towed hydrophone arrays, or other arrays. These arrays and applications may suffer from many of the same problems associated with in-well seismic arrays. Namely, these applications may require numerous nodes. Consequently, for these applications, it may also be beneficial to pre-assemble the entire array or portions thereof before transportation to a site.

Furthermore, while it is beneficial that the first divisions and the second divisions be rotatably coupled to the body of the apparatus, and rotatable with respect to each other, this is not strictly necessary in all applications. Thus, the first divisions and the second divisions, or either of these individually, can be rigidly coupled to the body (e.g., the cross members) of the apparatus. When such an embodiment is used, it will generally be helpful if some mechanism, such as a rotation mechanism (FIG. 1, element 62), is used to turn the apparatus at the well site, although the apparatus can also simply be allowed to freely rotate (e.g., on a rotatable plate or stake) as the array is deployed or retrieved.

Moreover, an embodiment in which the first and second divisions are not rotatable may be particularly useful for mere transportation purposes as opposed to deployment or retrieval. Indeed, in this rigidly coupled embodiment, the first and second divisions do not need to constitute separate components, but instead could comprise an integral component, or different sections of the same component, and "divisions" as used in this disclosure should not necessarily be understood to imply separate components.

It is intended that the invention include all such modifications and alterations to the full extent that they come within the scope of the following claims or the equivalents thereof.

What is claimed is:

1. An apparatus for transporting and deploying an array the apparatus comprising:
 a cable having multiple sensors with sections of the cable connected therebetween to provide the array;
 a body;
 a first division coupled to the body, wherein the first division comprises multiple first portions, each first portion having at least one of the multiple sensors disposed thereon; and
 a second division coupled to the body, wherein the second division comprises a second portion having the sections of the cable disposed thereon.

2. The apparatus of claim 1, wherein either the first division or the second division are rigidly coupled to the body.

3. The apparatus of claim 1, wherein either the first division or the second division are rotatably coupled with respect to the body.

4. An apparatus for transporting, deploying, or retrieving an array having at least one node with at least one section of cable connected thereto, the apparatus comprising:

a body;
at least one first division coupled to the body, wherein the first division comprises at least one first portion for accommodating at least one node; and
at least one second division coupled to the body, wherein the second division comprises a second portion for accommodating the section of cable, and wherein the first division is rotatable with respect to the second division.

5. The apparatus of claim 1, wherein the second division is adjacent to the first division.

6. The apparatus of claim 1, wherein the first and second divisions are cylindrical.

7. The apparatus of claim 1, further comprising a means for locking the first and second divisions together.

8. The apparatus of claim 1 further comprising a means for locking either the first or second division to the body.

9. The apparatus of claim 1, wherein the first and second divisions comprise holes for locking the first and second divisions.

10. The apparatus of claim 1, wherein the body comprises a cable drum.

11. The apparatus of claim 1, wherein the first portion of the first division comprises a cavity defined in the first division.

12. The apparatus of claim 1, wherein the first portion further comprises a means for holding the sensor at the first portion.

13. The apparatus of claim 1, wherein the first division comprises a guide for the section of cable.

14. The apparatus of claim 13, wherein the guide is curved.

15. The apparatus of claim 1, wherein the second portion comprises a cylindrical surface and first and second sidewalls extending beyond the surface.

16. The apparatus of claim 15, wherein the first and second sidewalls define a passage to pass the section of cable from the first division to the second division.

17. The apparatus of claim 1, wherein the apparatus comprises an alternating plurality of first and second divisions.

18. The apparatus of claim 1, wherein the section of cable comprises a fiber optic cable.

19. The apparatus of claim 1, wherein the sensor comprises a sensor and clamp assembly.

20. The apparatus of claim 1, wherein the first and second divisions comprise an integrated component.

21. An apparatus for transporting, deploying, or retrieving an array having at least one node with at least one section of cable connected thereto, the apparatus comprising:
a body;
at least one first division coupled to the body, wherein the first division comprises at least one first portion for accommodating at least one node, and wherein the first portion comprises a hinged member hinged on the first division, and wherein the node is affixable to the hinged member; and
at least one second division coupled to the body, wherein the second division comprises a second portion for accommodating the section of cable.

22. An apparatus for transporting and deploying an array, the apparatus comprising:
a cable having at least one sensor connected thereto to provide the array;
a body;
at least one first division coupled to the body, wherein the first division comprises at least one first portion having at least one of the at least one sensor of the array disposed thereon; and
a second portion having at least one section of the cable disposed thereon.

23. An apparatus for transporting, deploying, or retrieving an array having multiple nodes with sections of cable connected therebetween, the apparatus comprising:
a body comprising a cross member;
a plurality of first divisions coupled to the cross member, wherein the first divisions are capable of rotation relative to the body, and wherein each of the first divisions comprise at least one first portion for accommodating at least one of the nodes, the at least one first portion having a fastener for holding the at least one of the nodes at the first portion; and
a plurality of second divisions coupled to the cross member and alternating with the first divisions, wherein the second divisions are capable of rotation relative to the body, and wherein each of the second divisions comprise a second portion for accommodating the sections of cable.

24. The apparatus of claim 23, wherein the second division is adjacent to the first division.

25. The apparatus of claim 23, wherein the first and second divisions are cylindrical.

26. The apparatus of claim 23, wherein the second division is capable of rotation relative to the first division.

27. The apparatus of claim 23, further comprising a means for locking the first and second divisions together.

28. The apparatus of claim 23, further comprising a means for locking either the first or second division to the body.

29. The apparatus of claim 23, wherein the first and second divisions comprise holes for locking the first and second divisions.

30. The apparatus of claim 23, wherein the body comprises a cable drum.

31. The apparatus of claim 23, wherein the first portion of the first division comprises a cavity defined in the first division.

32. The apparatus of claim 23, wherein the first portion comprises a hinged member hinged on the first division.

33. The apparatus of claim 32, wherein the node is affixable to the hinged member.

34. The apparatus of claim 23, wherein the first division comprises a guide for the section of cable.

35. The apparatus of claim 34, wherein the guide is curved.

36. The apparatus of claim 23, wherein the second portion comprises a cylindrical surface and first and second sidewalls extending beyond the surface.

37. The apparatus of claim 36, wherein the first and second sidewalls define a passage to pass the section of cable from the first division to the second division.

38. The apparatus of claim 23, wherein the section of cable comprises a fiber optic cable.

39. The apparatus of claim 23, wherein the node comprises a sensor.

40. The apparatus of claim 23, wherein the node comprises a sensor and clamp assembly.

41. A method using an apparatus for deploying an array into a well, the array having a plurality of nodes connected by sections of cable, wherein the apparatus comprises alternating first and second divisions, and wherein the apparatus temporarily holds the nodes at first portions of the first divisions and temporarily holds the sections of cable at second portions of the second divisions, the method comprising:
  (a) releasing a node from a first portion;
  (b) affixing the node to a conveyance member;
  (c) releasing a section of cable from a second portion while deploying the conveyance member down the well; and
  (d) repeating steps (a) through (c) until the array is deployed into the well.

42. The method of claim 41, wherein the first and second divisions are rigidly coupled to the apparatus, and wherein step (c) comprises rotating the apparatus.

43. The method of claim 41, wherein step (c) comprises rotating the second portion with respect to the apparatus.

44. The method of claim 41, wherein the node is affixed to the conveyance member by clamping.

45. The method of claim 41, wherein releasing the node from the first portion comprises a step selected from the group of unhinging, unbanding, unbolting, unclasping, or unclamping.

46. The method of claim 41, wherein step (a) comprises unhinging the first portion from the first division.

47. The method of claim 41, wherein step (a) comprises applying a force to the node.

48. The method of claim 41, wherein the first portion comprises a cavity formed in the first division.

49. The method of claim 41, wherein the apparatus comprises a cable drum.

50. The method of claim 41, wherein step (c) comprises releasing the section of cable from a passage extending between the first and second divisions.

51. The method of claim 41, wherein the section of cable comprises a fiber optic cable.

52. The method of claim 41, wherein the node comprises a sensor.

53. The method of claim 41, wherein the node comprises a sensor and clamp assembly.

54. A method using an apparatus for retrieving an array deployed into a well, the array having a plurality of nodes connected by sections of cable, wherein the apparatus comprises alternating first and second divisions, and wherein the apparatus is capable of holding the nodes at first portions of the first divisions and capable of holding the sections of cable at second portions of the second divisions, the method comprising:
  (a) releasing a node from a conveyance member;
  (b) affixing the node to a first portion;
  (c) winding a section of cable onto a second portion while retrieving the conveyance member from the well; and
  (d) repeating steps (a) through (c) until the array is retrieved onto the apparatus.

55. The method of claim 54, wherein the first and second divisions are rigidly coupled to the apparatus, and wherein step (c) comprises rotating the apparatus.

56. The method of claim 54, wherein step (c) comprises rotating the second portion with respect to the apparatus.

57. The method of claim 54, wherein the node is released from the conveyance member by unclamping.

58. The method of claim 54, wherein affixing the node to the first portion comprises a step selected from the group of hinging, banding, bolting, clasping, or clamping.

59. The method of claim 54, wherein step (b) comprises hinging the first portion to the first division.

60. The method of claim 54, wherein step (b) comprising applying a force to the node.

61. The method of claim 54, wherein the first portion comprises a cavity formed in the first division.

62. The method of claim 54, wherein the apparatus comprises a cable drum.

63. The method of claim 54, wherein step (c) comprises winding the section of cable through a passage extending between the first and second divisions.

64. The method of claim 54, wherein the section of cable comprises a fiber optic cable.

65. The method of claim 54, wherein the node comprises a sensor.

66. The method of claim 54, wherein the node comprises a sensor and clamp assembly.

67. A method for deploying an array having a plurality of nodes connected by sections of cable into a well, comprising:
  providing an apparatus having a first division and a second division, wherein the apparatus temporarily holds the nodes at first portions of the first division and temporarily holds the sections of cable at a second portion of the second division;
  releasing one of the nodes from one of the first portions;
  affixing the node to a conveyance member;
  releasing one of the sections of cable from the second portion while deploying the conveyance member down the well; and
  repeating releasing one of the nodes, affixing the node and releasing one of the sections of cable until the array is deployed into the well.

* * * * *